United States Patent [19]

Takeuchi

[11] Patent Number: 5,186,298
[45] Date of Patent: Feb. 16, 1993

[54] CLUTCH COVER ASSEMBLY

[75] Inventor: Hiroshi Takeuchi, Neyagawa, Japan

[73] Assignee: Kabushiki Kaisha Daikin Seisakusho, Osaka, Japan

[21] Appl. No.: 752,584

[22] PCT Filed: Dec. 6, 1990

[86] PCT No.: PCT/JP90/01587

§ 371 Date: Aug. 27, 1991

§ 102(e) Date: Aug. 27, 1991

[87] PCT Pub. No.: WO91/10074

PCT Pub. Date: Jul. 11, 1991

[30] Foreign Application Priority Data

Dec. 29, 1989 [JP] Japan .................... 1-151635

[51] Int. Cl.⁵ .............................. F16D 13/75
[52] U.S. Cl. .............................. 192/111 A
[58] Field of Search ............ 192/109 A, 111 A, , 192/70.25

[56] References Cited

U.S. PATENT DOCUMENTS

| 2,678,120 | 5/1954 | Binder | 192/111 A |
| 2,703,164 | 3/1955 | Binder | 192/111 A |
| 4,924,991 | 5/1990 | Takeuchi | 192/111 A |

FOREIGN PATENT DOCUMENTS

| 2599446 | 12/1987 | France | 192/111 A |
| 2606477 | 5/1988 | France | 192/111 A |
| 63-270925 | 11/1988 | Japan . | |
| 2176256 | 12/1986 | United Kingdom | 192/111 A |

Primary Examiner—Rodney H. Bonck
Attorney, Agent, or Firm—Armstrong, Westerman, Hattori, McLeland & Naughton

[57] ABSTRACT

A clutch cover assembly equipped with a diaphragm spring (8), which is intended to prolong a service life of a clutch by making it possible to automatically maintain an initial setting load according to a wear amount of a facing (6). For this purpose, fulcrum rings (14, 15) are divided into inside and outside pieces, fitted in a pressure plate (7) in such a manner as movable in an axial direction, and pressed to the diaphragm spring (8) side through annular spring receiving plates (38, 39) by inside and outside pressing springs (31, 32). Annular lock wires (16, 17) movable in the axial direction are disposed between the fulcrum rings (14, 15) and the pressure plate (7), and lock springs (26, 27) weaker than the foregoing pressing springs (31, 32) are compressively installed between the lock wires (16, 17) and the spring receiving plates (38, 39), so that axial return motions of the fulcrum rings (14, 15) are locked.

1 Claim, 3 Drawing Sheets

5,186,298

CLUTCH COVER ASSEMBLY

TECHNICAL FIELD

This invention relates to a clutch cover assembly equipped with a diaphragm spring.

BACKGROUND ART

In the conventional clutch cover assembly, a pressure plate 7 is connected to a clutch cover 2 by a strap plate 21 and a diaphragm spring 8 is contacted with a fulcrum boss 7a formed integrally with the pressure plate 7, as illustrated in FIG. 5.

In this structure, it is required to ensure a wear-in allowance D by a load characteristic as diagrammed in FIG. 6. However, there is a limitation on a range of the wear-in allowance D so that, when a wear amount of a facing 6 increases, the diaphragm spring 8 is inclined to such an extent that an outer peripheral end portion of the diaphragm spring is near to the pressure plate 7 side when the clutch is engaged. The load characteristic is thereby decreased so that the facing can not be utilized fully to its maximum wear amount.

In order to increase the wear-in allowance and prolong service life of the facing, the applicant of this invention has proposed, in Published Patent Application (KOKAI) No. 63-270925 for example, a clutch cover assembly capable of automatically increasing height of a fulcrum point portion with an increase in a wear of the facing. In this structure, a fulcrum point portion, contacting with a diaphragm spring, is divided into two inside and outside fulcrum rings so that the fulcrum rings are pushed up to the diaphragm spring side, with an increase in wear of the facing, by means of actions of a slide key and spring.

However, because the slide key is fitted in the pressure plate, so as to be movable in a radial direction, the fulcrum rings are sometimes pushed up excessively y centrifugal force caused by rotation of the clutch, so that it is difficult to adjust weights of the fulcrum rings and the slide key.

OBJECT OF THE INVENTION

An object of the invention is to provide a prolonged service life of clutch and to increase height of fulcrum point portion precisely without being affected by centrifugal force, by making it possible to automatically maintain an initial setting load correspondingly to a wear amount of a facing.

DISCLOSURE OF THE INVENTION

In order to accomplish the above-mentioned object, this invention provides a clutch cover assembly, in which inside and outside fulcrum rings are fitted in an annular concave portion of a pressure plate in such a manner as to be movable in an axial direction. Inside and outside fulcrum point portions, contacting with a diaphragm spring, are formed on the both fulcrum rings with a space left between them in a radial direction. Stepped portions are formed, respectively, in order to restrict the outside fulcrum point portion from moving to the diaphragm spring side beyond the inside fulcrum point portion. Inside and outside pressing springs are compressively installed between the fulcrum rings and bottom faces of the concave portions, respectively, through annual ar spring receiving plates, the fulcrum rings being thereby pressed to the diaphragm spring side. Axially movable annular lock wires are installed between the fulcrum rings and wall surfaces of the concave portions, respectively. Lock springs, having spring forces weaker than those of the pressing springs, are compressively installed between the lock wires and the spring receiving plates, respectively, to press the lock wires on tapered faces of the fulcrum springs, so that axial return motions of the fulcrum rings are thereby locked.

BRIEF DESCRIPTION OF THE DRAWINGS

FIG. 2 is a vertical sectional partial view showing a clutch engaged state at time of wear-in.

FIG. 3 is a vertical sectional partial view showing a clutch released state at time of wear-in.

BEST MODE FOR CARRYING OUT THE INVENTION

Figure 1:
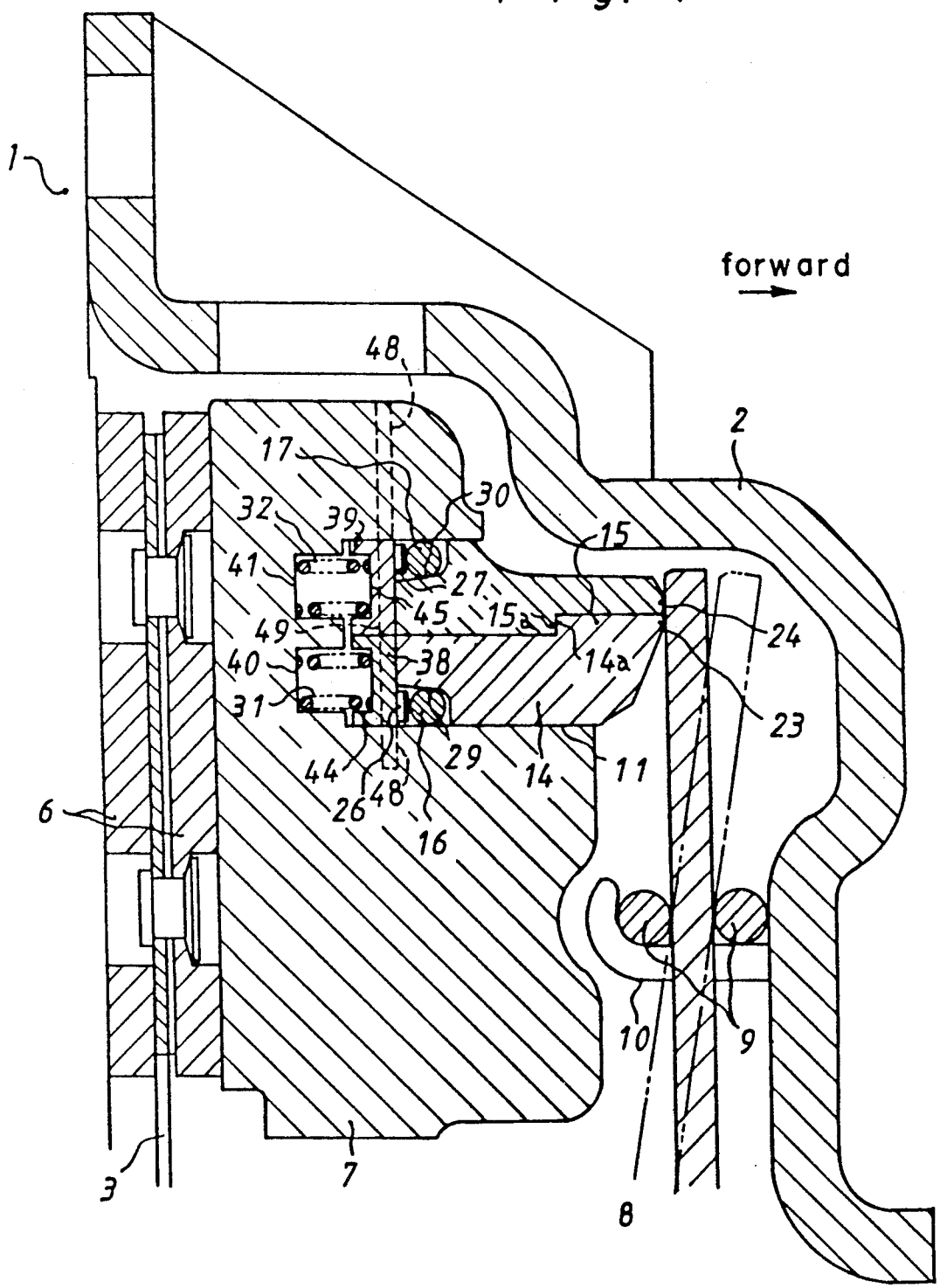
FIG. 1 is a vertical sectional partial view showing an initial setting state of a clutch cover assembly to which this invention is applied.

As shown in FIG. 1, clutch cover 2 is fastened to an end face of input side flywheel 1 and extends forward in an axial direction. A facing 6 of a clutch disc 3, a pressure plate 7 and a diaphragm spring 8 are disposed between a front end wall of the clutch cover 2 and the flywheel 1 in consecutive order from the flywheel 1 side (rear side). The diaphragm spring 8 is held by two wire rings 9, maintained in a circular shape by plural tabs 10 on the clutch cover 2. Although not shown in the figure, an inner peripheral end portion of the diaphragm spring 8 fronts on a release bearing, and an outer peripheral end portion of the diaphragm spring 8 is moved forward, by a releasing action of the release bearing, around the wire rings 9 as shown by a two-dot chain line.

Figure 5:
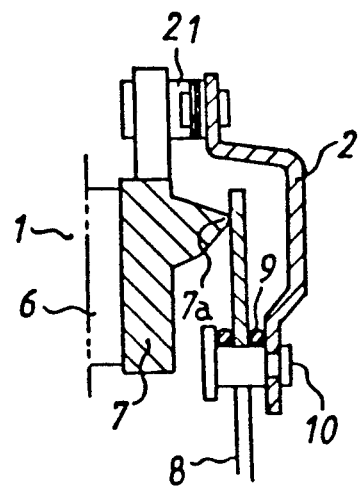
FIG. 5 is a vertical sectional view of a conventional embodiment.
Figure 6:
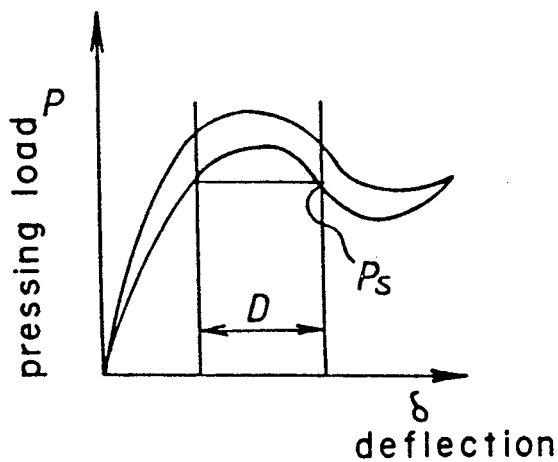
FIG. 6 is a load characteristic diagram.

Although not illustrated in FIG. 1, the pressure plate 7 is coupled to the clutch cover 2 movably in the axial direction through a strap plate (21) in the same way as the conventional structure of FIG. 5. An annular concave portion 11 is formed on a front surface of the pressure plate 7, an annular inside fulcrum ring 14, movably in the axial direction, fits in a radial inner peripheral surface of the concave portion 11 and an annular outside fulcrum ring 15, also movably in the axial direction fits in a radial outer peripheral surface of the concave portion 11. Annular fulcrum point portions 23 and 24 are formed on front ends of the both fulcrum rings 14 & 15 respectively with a small distance therebetween in the radial direction. Stepped portions 14a & 15a, fronting each other, are formed on a fitting part of fulcrum rings 14 & 15. The outside fulcrum ring 15 is restricted from shifting forward in relation to the inside fulcrum point portion 14 by contact between stepped portions 14a & 15a so that fulcrum point portions 23 & 24 are kept aligned in an approximately same vertical plane.

Annular spring receiving plates 38 & 39, movable in the axial direction, fit in the concave portion 11 at backsides of the fulcrum rings 14 & 15. Plural spring guide holes 44 & 45 are formed on rear faces of the spring receiving plates 38 & 39 with spaces left in a circumferential direction, and plural spring guide holes 40 & 41 are formed on a bottom surface of the concave portion 11 at locations corresponding to spring guide holes 44 & 45. An inside pressing spring 31, compressed in the axial direction, is housed in the inside spring guide holes 40 & 44 so as to press the inside fulcrum ring 14 forward. An outside pressing spring 32, compressed in the axial direction, is housed in the outside spring guide holes 41 & 45 so as to press the outside fulcrum ring 15 forward. Spring loads of pressing springs 31 & 32 are smaller than pressing load of diaphragm spring 8, so that springs 31 & 32 do not protrude the fulcrum rings 14 & 15 forward against diaphragm spring 8.

In order to lock the inside fulcrum ring 14 so as not to move backward in the axial direction; an annular inside lock wire 16, movable in the axial direction, is disposed between the inside fulcrum ring 14 and an inner peripheral surface of concave portion, an inside tapered face 29, which comes to radial inside as it goes forward, is formed on an inner peripheral surface of the inside fulcrum ring 14, and an annular corrugated inside lock spring 26, weaker than the foregoing inside pressing spring 31, is compressively installed between the inside lock wire 16 and the inside spring receiving plate 38. The inside lock wire 16 is thereby forcedly pressed forward into contact against the inside tapered surface 29, so that the inside fulcrum ring 14 is locked against backward movement in the axial direction.

In order to lock the outside fulcrum ring 15 so as not to move backward in the axial direction; an annular outside lock wire 17, movable in the axial direction, is disposed between the outside fulcrum ring 15 and an outer peripheral surface of concave portion, an outside tapered face 30, is formed on an outer peripheral surface of the outside fulcrum ring 15, and an annular corrugated outside lock spring 27, weaker than the foregoing outside pressing spring 32, is compressively installed between the outside lock wire 17 and the outside spring receiving plate 39. The outside lock wire 17 is thereby forcedly pressed forward into against the outside tapered surface 30, so that the outside fulcrum ring 15 is locked against backward movement in the axial direction.

Plural radial pin passing holes 48 are made on the pressure plate 7, and pin fitting grooves 49, corresponding to the pin passing holes 48, are formed on front faces of the spring receiving plates 38 & 39. These passing holes 48 and the grooves 49 are utilized when the clutch cover assembly is assembled. Namely, the pressing springs 31 & 32 and the spring receiving plates 38 & 39 are first inserted in the concave portion 11 at the time when the clutch cover assembly is assembled. Then, in a process before fitting the fulcrum rings 14 & 15, a pin, not shown, is inserted in the passing hole 48 and the groove 49, with the pressing springs 31 & 32 kept compressed, and the fulcrum rings 14 & 15 are fitted in the concave portion 11 together with the lock wires 16 & 17 etc. under the above state. The pin is, of course, removed, when the clutch has been installed and before the clutch is used.

Function will be described hereunder. FIG. 1 shows the initial setting state, wherein both fulcrum point portions 23 & 24 contact with the diaphragm spring 8 and the respective lock wires 16 & 17 lock the fulcrum rings 14 & 15 so as not to move backward in the axial direction. When a releasing operation is done in this initial state, the diaphragm spring 8 inclines so that its outer peripheral end portion comes to the front side as shown by the two-dot chain line, the pressure plate 7 is moved forward by a reaction force of the strap plate, and the clutch is released. The diaphragm spring 8 leaves the outside fulcrum point portion 24 at the time of releasing, however, the outside fulcrum ring 15 is not pushed forward by the mutual contact of the stepped portions 14a & 15a and the both fulcrum point portions 23 & 24 are kept aligned within an approximately same vertical plane.

Figure 2:
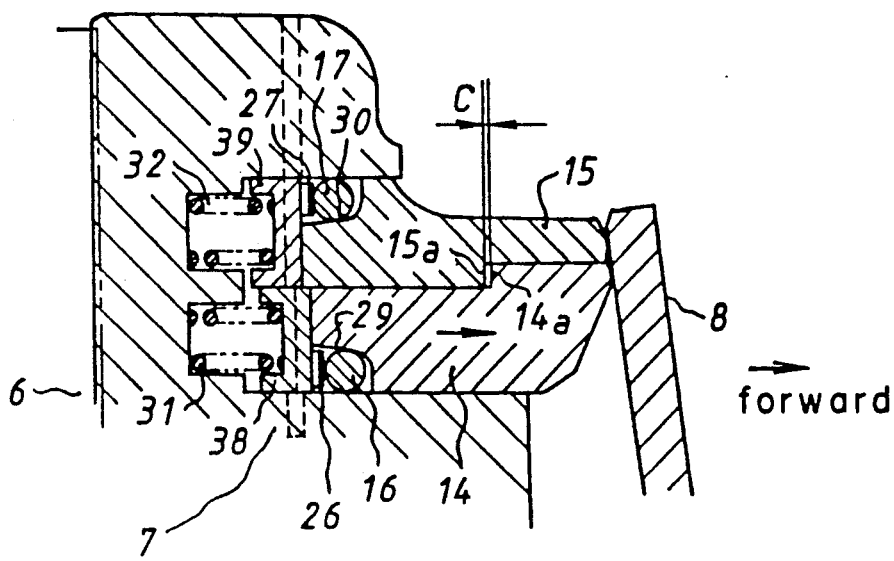
Figure 3:
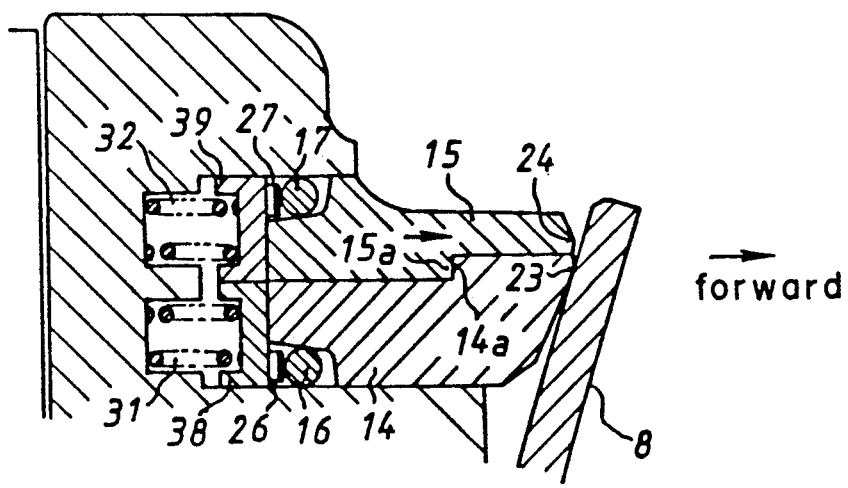

FIG. 2 shows a case where the facing 6 is worn out resulting from operation i.e. the wear-in state, and the diaphragm spring 8 is so inclined that its outer peripheral end portion comes to the backside when the clutch is engaged. Since a clearance is produced between the inside fulcrum point portion 23 and the diaphragm spring 8 due to this inclination, the fulcrum ring 14 and the inside spring receiving plate 38 are pushed forward by the inside pressing spring 31 and are advanced by the clearance c until they contact with the diaphragm spring 8.

When the releasing operation is carried out from the state of FIG. 2, the diaphragm spring 8 is so inclined that its outer peripheral end portion comes to the front side to contact with the inside fulcrum point portion 23 and, at the same time, leaves the outside fulcrum point portion 24 to the front side. In this instance, the outside fulcrum ring 15 is pushed forward by the outside pressing spring 32 the distance of clearance c (FIG. 2), and the stepped portions 14a & 15a are, again, mated with each other so that the both fulcrum point portions 23 & 24 are again aligned within the same vertical plane.

Namely, under the wear-in state, the both fulcrum point portions 23 & 24 are automatically advanced (heightened) by an amount corresponding to the wear amount of the facing 6, and the diaphragm spring 8 is returned to its initial setting state.

Figure 4:
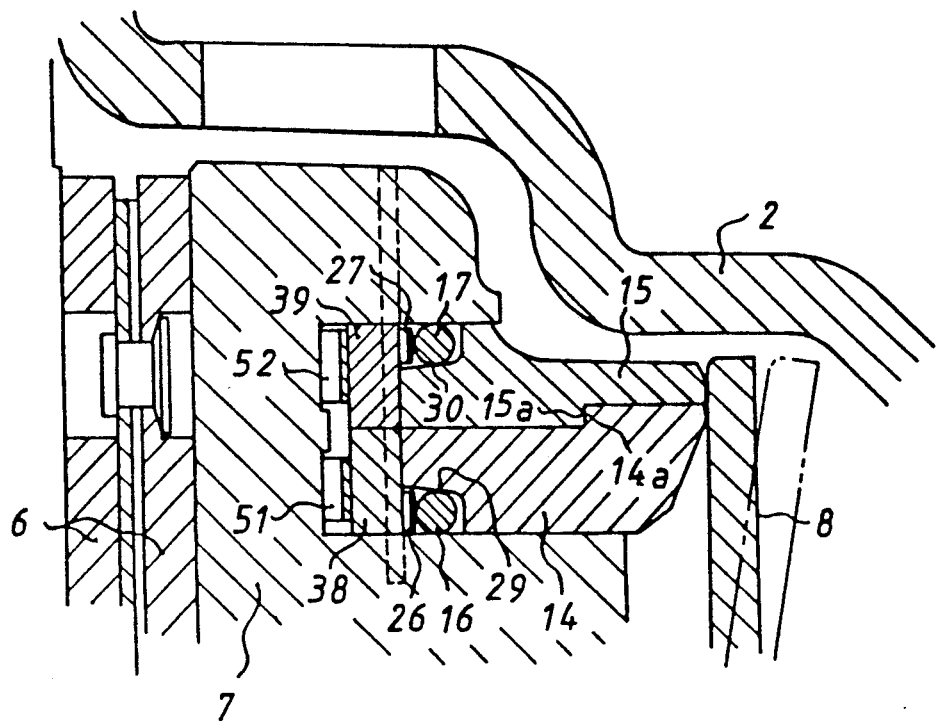
FIG. 4 is a vertical sectional partial view showing another embodiment.

The embodiment of FIG. 4 is an example wherein annular corrugated springs 51 & 52 are compressively installed between bottom faces of concave portions of the spring receiving plates 38 & 39 in place of the inside and outside pressing springs.

Further, a conned disc spring may be sued for the pressing spring.

EFFECT OF THE INVENTION

According to the present invention, the following advantages become obtainable:

(1) By carrying out only an ordinary releasing operation under the wear-in state, the heights of the fulcrum point portions 23 & 24 can be increased automatically according to the wear amount of the facing 6 owing to the pushing up actions of the pressing springs 31 & 32 and the holding actions of the lock wires 16 & 17.

Accordingly, the facing can be utilized fully to its maximum wear limit without requiring maintenance work, and interval of replacement of clutch can be prolonged, and an improvement in its service life can be accomplished.

(2) The annular lock wires 16 & 17 are installed for serving as a locking mechanism for the fulcrum rings 14 & 15 and the spring receiving plates 38 & 39 are formed into the annular members, so that the preferable automatic adjusting function can always be maintained without being affected by the rotation of clutch, as compared with the structure disclosed in Published Patent Application (KOKAI) No. 63-270925 wherein the slide key is movable in the radial direction.

(3) Since the heights of the fulcrum point portions 23 & 24 are automatically increased according to the wear amount of the facing 6, the setting load can always be kept at a specified value during servicing period.

Namely, the setting load, the same as that set in the initial assembly, can always be maintained and the torque transmission performance of the clutch can be kept unchanged regardless of the wear of facing, by setting the setting load in the initial assembly to the peak value of the load characteristic.

(4) Because the heights of the fulcrum point portions 23 & 24 are automatically increased according to the wear amount of the facing 6, the position (inclination) of the diaphragm spring 8 at the time of the clutch engagement does not change so that the releasing characteristic is kept unchanged.

Consequently, the clutch can be released always with the same releasing operation.

What is claimed is:

1. A clutch cover assembly having a pressure plate, a diaphragm spring and inside and outside fulcrum rings fitted in an annular axially extending cavity in said pressure plate and movable in an axial direction, said fulcrum rings each having a tapered face tapered away from an adjacent side wall of said cavity, radial inside and outside radially spaced fulcrum points on such fulcrum rings for contact with said diaphragm spring, said inside and outside fulcrum rings each having a radially extending step for engagement with each other for restricting said outside fulcrum ring and said fulcrum point thereon from moving said diaphragm spring in contact with said fulcrum point on said outside fulcrum ring beyond said fulcrum point on said inside fulcrum ring, inside and outside pressing springs compressively positioned between each of said inside and outside fulcrum rings and bottom faces of said axially extending cavity and an annular spring receiving plate between said pressing springs and each of said inside and outside fulcrum rings, said fulcrum rings being pressed against said diaphragm spring by said pressing springs and spring receiving plates, axially movable annular lock wires positioned between said fulcrum rings and said side wall surfaces of said axially extending cavities and lock springs, having spring forces weaker than spring forces of said pressing springs compressively positioned between said lock wires and said spring receiving plates for pressing said lock wires on said tapered faces against said adjacent side walls of said cavity for locking axial return motion of each of said fulcrum rings in said cavity.

* * * * *